US006869675B2

(12) United States Patent
Nair et al.

(10) Patent No.: US 6,869,675 B2
(45) Date of Patent: Mar. 22, 2005

(54) DURABLE OVERCOAT MATERIAL

(75) Inventors: Mridula Nair, Penfield, NY (US); David J. Steklenski, Rochester, NY (US); Tamara K. Jones, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 66 days.

(21) Appl. No.: 10/292,650

(22) Filed: Nov. 12, 2002

(65) Prior Publication Data

US 2004/0091696 A1 May 13, 2004

(51) Int. Cl.$^7$ ............................ B32B 5/16; B32B 27/00

(52) U.S. Cl. .................... 428/327; 428/423.1; 428/500; 428/908.8

(58) Field of Search .............................. 428/327, 423.1, 428/500, 908.8, 323, 411.1; 525/90, 97, 86

(56) References Cited

U.S. PATENT DOCUMENTS

| | | | | |
|---|---|---|---|---|
| 4,059,768 A | | 11/1977 | Van Landeghem et al. | 250/483.1 |
| 4,491,620 A | | 1/1985 | Joiner, Jr. | 428/421 |
| 4,983,848 A | | 1/1991 | Hunter | 250/483.1 |
| 5,477,053 A | * | 12/1995 | Umemoto et al. | 250/483.1 |
| 6,221,516 B1 | | 4/2001 | Khoda et al. | 428/690 |
| 6,228,433 B1 | * | 5/2001 | Witt | 427/487 |
| 6,258,441 B1 | * | 7/2001 | Oguchi et al. | 428/141 |

* cited by examiner

*Primary Examiner*—Sheeba Ahmed
(74) *Attorney, Agent, or Firm*—Paul A. Leipold

(57) ABSTRACT

This invention provides an element comprising a wear-resistant coating wherein said coating comprises radiation-cured urethane acrylate polymers and micronized polytetrafluoroethylene particles.

9 Claims, No Drawings

DURABLE OVERCOAT MATERIAL

FIELD OF THE INVENTION

The present invention relates to fluorescent X-ray image intensifying screens having a radiation curable, hydrophobic, wear and abrasion resistant protective coating. The invention also relates to radiographic imaging assemblies containing such screens.

BACKGROUND OF THE INVENTION

In silver halide photography one or more radiation sensitive emulsion layers are coated on a support and imagewise exposed to electromagnetic radiation to produce a latent image in the silver halide emulsion layer(s). The latent image is converted to a viewable image upon subsequent chemical photoprocessing.

Roentgen discovered X-radiation by the inadvertent exposure of a silver halide photographic element to X-rays. In 1913 the Eastman Kodak Company introduced its first silver halide photographic element specifically intended to be exposed by X-radiation (that is, its first silver halide radiographic element).

The medical diagnostic value of radiographic imaging is widely accepted. Nevertheless, the desirability of limiting patient exposure to X-radiation has been appreciated from the inception of medical radiography. Silver halide radiographic elements are more responsive to longer wavelength electromagnetic radiation than to X-radiation.

Low X-radiation absorption by silver halide radiographic elements as compared to absorption of longer wavelength electromagnetic radiation led quickly to the use of fluorescent intensifying screens (hereinafter, radiographic phosphor panels) when the Patterson Screen Company in 1918 introduced matched intensifying screens for Kodak's first dual coated radiographic element.

A radiographic phosphor panel contains on a support a fluorescent phosphor layer that absorbs X-radiation and emits longer wavelength radiation to an adjacent radiographic element in an imagewise pattern corresponding to that of the X-radiation received.

Hence intensifying screens containing fluorescent substances are employed to increase the exposure of a photosensitive plate or film without increasing the X-ray exposure dose to the object of the radiograph. These screens are customarily arranged inside a cassette, so that each side of a silver halide film, emulsion-coated on one or both sides, after the cassette has been closed, is in intimate contact with an adjacent screen. In exposing the film the X-rays pass through one side of the cassette, through one entire intensifying (front) screen, through the light-sensitive silver halide film emulsion-coated on both sides and strike the fluorescent substances (phosphor particles) of the second (back) intensifying screen. This causes both screens to fluoresce and to emit fluorescent light into their adjacent silver halide emulsion layer, which is inherently sensitive or spectrally sensitized to the light emitted by the screens.

The commonly used fluorescent screens comprise a support and a layer of fluorescent particles dispersed in a coherent film-forming macromolecular binder medium. Conventional X-ray screens have protective topcoats comprising, for example, cellulose acetate or other polymeric materials that form a coherent layer on coating. These topcoats are often inadequate to shield the active layer from abrasion caused by the rapid exchange of the film in and out of cassettes or automatic changer systems. Scratches can also occur during periodic cleaning of the X-ray screens by laboratories technicians. Mechanical damage due to scratches and abrasion can result in surface defects leading to artifacts in the radiographs produced. A topcoat must also provide a barrier to the penetration of moisture, in the form of water vapor or liquid water, which would degrade the performance of the phosphor. Moisture penetration, commonly has the effect of causing the panel to either have reduced light output, requiring the use of increased x-ray dose to produce the same radiographic film density, or causing more localized dimmer areas as artifacts in resulting radiographs. In addition, the prior art topcoats tend to stain when accidentally contacted by processing fluids (e.g., developer and fixer) associated with the film development or when unprocessed film is placed in contact with a fluorescent screen which has been cleaned with water but not thoroughly dried. The failure of the topcoat shortens the useful life of the X-ray screen, and the staining may cause unwanted image areas to appear on the film during exposure. Further rapid exchange of radiographic film in the cassette can lead to air entrapment if enough time is not given for the air trapped between the phosphor screens and the film to be purged. Entrained air can lead to localized loss of image sharpness due to separation of the film from the screen surface. None of these defects can be tolerated in the medical X-ray area where a patient's life may depend on the results.

Many improvements to protective topcoats have been described in the art. U.S. Pat. No. 6,221,516 B1 describes a radiation image storage panel that has a phosphor layer which comprises a protective film. The protective film is a coated layer containing at least 30 percent by weight of a fluorine containing resin which is soluble in an organic solvent, such as a copolymer derived from a fluoro olefin and other copolymerizable monomer, polytetrafluoroethylene or modified polytetrafluoroethylene. The protective film prevents lowering of sensitivity even if the panel is repeatedly used. U.S. Pat. No. 4,491,620 describes a topcoat or abrasion layer useful for protecting an x-ray intensifying screen comprising a copolymer of a fluoro ester and methyl methacrylate. The topcoat is flexible, adhesive, and non-staining and permits the use of the x-ray screen in the modern rapid changer systems. U.S. Pat. No. 4,983,848 describes x-ray intensifying screens that have an improved surface made by bonding a thin, clear, transparent, tough, flexible, dimensionally stable polyamides film thereon. Such screens display very low average dynamic coefficient of friction, very good resistance to wear and low static susceptibility which permits long-term use in both cassettes and rapid handling incurred in changer systems. U.S. Pat. No. 4,059,768 describes a fluorescent x-ray image intensifying screen comprising outer layer containing solid particular material protruding from a coherent film forming organic binder medium and having a static friction coefficient at room temperature not higher than 0.30 on steel. When solid particular material protrudes from a surface there exists the risk of removing the particles during cleaning or other abrasive encounter resulting in degradation of the surface for example the formation of glossy streaks where the solid particulates have been removed.

PROBLEM TO BE SOLVED BY THE INVENTION

There is still need to have an overcoat for X-ray intensifying screens which simultaneously shows improved abrasion and stain resistance and rapid air purge during loading of the cassette with the x-ray film.

SUMMARY OF THE INVENTION

The present invention provides an element comprising a wear-resistant coating wherein said coating comprises radiation-cured urethane acrylate polymers and polytetrafluoroethylene particles.

ADVANTAGEOUS EFFECT OF THE INVENTION

The invention provides an intensifying screen overcoat which simultaneously shows improved abrasion and stain resistance and rapid air purge during loading of the cassette with the x-ray film.

DETAILED DESCRIPTION OF THE INVENTION

The invention provides numerous advantages over prior practices. It provides a scratch resistant intensifying screen coating having resistance to the penetration of waterborne chemical compounds. The screen has a surface that enables rapid air purge between the X-ray film and the intensifying screen after the two are brought into contact, while maintaining a high level of wear and abrasion resistance. The radiation curable formulations are easily coatable on the porous phorsphor screen such that they stay on the surface and cure to result in a durable overcoat layer. These and other advantages will be apparent from the detailed description below.

In order to accomplish the above invention, the fluorescent X-ray image intensifying screen according to the present invention has an outermost layer derived from a radiation curable, hydrophobic, wear and abrasion resistant film-forming organic binder containing micronized polytetrafluoroethylene particles.

In accordance with the present invention, the outermost abrasion resistant layer of the present invention is derived from actinic radiation curable dispersions of oligomers or monomers containing micronized polytetrafluoroethylene particles coated onto a layer of phosphor particles dispersed in one or more binders and coated over a flexible transparent support, such that it provides advantageous properties such as good film formation, excellent abrasion resistance, toughness, resistance to aqueous solutions and excellent air purge. Examples of actinic radiation include ultraviolet (UV) radiation and electronic beam radiation. Of these UV is preferred.

UV curable compositions useful for creating the abrasion resistant layer of this invention may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photoinitiators are required to absorb the UV light energy, decompose to form free radicals, and attack the acrylate group C═C double bond to initiate polymerization. Cationic chemistry utilizes cycloaliphatic epoxy resins and vinyl ether monomers as the primary components. Photoinitiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the, abrasion resistant layer in this invention are those derived from photo polymerizable monomers and oligomers such as acrylate and methacrylate oligomers (the term "(meth)acrylate" used herein refers to acrylate and methacrylate) of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth) acrylate, 1,6-hexanediol di(meth)acrylate, or neopentyl glycol di(meth)acrylate and mixtures thereof, and acrylate and methacrylate oligomers derived from relatively low-molecular weight polyester resin, polyether resin, epoxy resin, polyurethane resin and the like, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth) acrylate, hexanediol (meth)acrylate, tripropylene glycol di(meth)acrylate, diethylene glycol di(meth)acrylate, pentaerythritol tri(meth)acrylate, dipentaerythritol hexa(meth) acrylate, 1,6-hexanediol di(meth)acrylate, or neopentyl glycol di(meth)acrylate.

Among others, in the present invention, conveniently used radiation curable lacquers include urethane (meth) acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanates such as toluene diisocyanate, will yield an aromatic urethane acrylates oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serves as reactive sites for free radical initiated polymerization. Choices among isocyanates, polyols, and acrylate or methacrylate termination units allow considerable lattitude in the development of urethane acrylates oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, in the present invention, conveniently used radiation curable resins include polyfunctional acrylic compounds derived from polyhydric alcohols and their derivatives such as mixtures of pentaerythritol tetraacrylate and pentaerythritol triacrylate functionalized aliphatic urethanes derived from isophorone diisocyanate and the like. Some examples of urethane acrylates oligomers used in the practice of this invention that are commercially available include oligomers from Sartomer Company (Exton, Pa.). An example of a radiation curable resin that is conveniently used in the practice of this invention is CN 968 from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, a conveniently used initiators are 1-hydroxycyclohexyl phenyl ketone and 2-methyl-1-[4-(methyl thio)phenyl]-2-morpholinopropanone-1.

Additionally, in the present invention, the radiation curable lacquers or resins may also include other polymeric binders such as any film-forming (preferably hydrophobic) polymeric material, photographically inert towards a silver halide emulsion layer. Materials of this type include e.g. cellulose derivatives e.g. cellulose nitrate, cellulose triacetate, cellulose acetate propionate, cellulose acetate butyrate, polyamides, polystyrene, polyvinyl acetate, polyvinyl chloride, silicone resins, poly (acrylic ester) and poly (methacrylic ester) resins, and fluorinated hydrocarbon resins, and mixtures of the foregoing materials. Representative examples of various individual members of these binder materials include the following resinous materials: poly(methyl methacrylate), poly(n-butyl methacrylate), poly (isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene and tetrafluoroethylene, and poly(vinylidene fluoride). Of the above mentioned polymers, poly(methyl methacrylate) is especially preferred for use as the additional binder polymer in the radiation curable abrasion resistant layer compositions applied in the invention. Additional polymeric binders are useful in the practice of this invention for enhancing the viscosity of the coating dispersion to enable coatability on the porous phospor layer. Further, the dried, uncured coating, in the presence of such polymers appears dry to the touch even prior to UV curing of the overcoat offering flexibility in the manufacturing process. The polymethylmethacryate preferably has a weight average molecular weight of greater than 100,000 and more preferably a weight average molecular weight of between 100,000 and 2,000,000. The amount of the polymeric binder resin employed in the radiation cured layer composition may vary considerably. The binder may be present in an amount varying from about 20 to about 80 percent by weight of the radiation cured layer, preferably from about 30 to 60 percent by weight of the layer.

The binder of the invention desirably provides a film having a suitable pencil hardness of at least 2H and preferably 2H to 8H for good scratch resistance.

The particles that provide the air purge properties are dispersed in the radiation curable abrasion resistant layer composition as described above and are micronized polytetrafluoroethylene particles having an average size of less than 20 micrometers, wherein at least 90% of the particles have a size of between 2 and 8 micrometers. Suitably, the micronized particles of this invention have an average particle size ranging from 2 to 20 micrometers, preferably from 2 to 15 micrometers and most preferred from 2 to 8 micrometers for good air purge.

Because of their small size and irregular structure and such particles can allow the formation of a mechanical bond with the UV cured matrix. This prevents removal and dusting of the particles from the surface of the coating during abrasive handling of the phosphor screens. Large spherical matte particles that are used in the art for providing air purge on the other hand are difficult to adhere to a surface layer and have a higher chance of being removed from the surface during handling resulting in dusting and glossy streaks.

The micronized polytetrafluoroethylene particles are present in the layer in an amount from about to 5 percent to 50 percent of the radiation cured layer, more preferably from 10 percent to 40 percent and most preferably from 10 percent to 30 percent for good air purge and antifriction properties. In accord with an embodiment of the invention presence of the micronized polytetrafluoroethylene particles in radiation cured layer act as an anti friction material and enables rapid air purge during loading of the cassette with the x-ray film. An example of micronized polytetrafluoroethylene particles that are conveniently used in the practice of this invention are Michem® Wax 492 from Michelman Inc., average particle size 6–8 micrometers, and a weight average molecular weight of between 30,000 and 100,000.

Solvents employable for coating the, abrasion resistant layer of this invention have preferably boiling points within the range from 50° to 200° C., under atmospheric pressure. Such solvents include those composed of a kind of ketone or a kind of ester carboxylate, such as acetone, diethyl ketone, the dipropyl ketone, methyl ethyl ketone, methyl butyl ketone, methyl isobutyl ketone, cyclohexanone, methyl formate, methyl formate, propyl formate, isopropyl formate, butene formate, methyl acetate, ethyl acetate, propyl acetate, isopropyl acetate, butyl acetate, isobutyl acetate, sec butyl acetate, amyl acetate, isoamyl acetate, methyl propionate, ethyl propionate, methyl butyrate, ethyl butyrate, methyl lactate and the like. The solvents may be composed of either a single component or a mixture of two or more components, and furthermore a solvent other than the solvents exemplified above may be added within a range where the performance of the resin composition is not impaired. Suitable solvents are acetone and methyl ethyl ketone. Preferably the concentration of organic solvent is 1–99% percent by weight of the total coating composition.

The ultraviolet polymerizable monomers and oligomers containing these micronized polytetrafluoroethylene particles are applied to the phosphor layer surface and subsequently exposed to UV radiation to form an optically clear cross-linked abrasion resistant layer. The preferred UV cure absorbance energy is between 50 and 1000 $mJ/cm^2$.

The thickness of the radiation-cured, wear and abrasion resistant layer is generally about 0.5 to 50 microns preferably 1 to 20 microns more preferably 2 to 10 microns.

The radiation cured layer in accordance with this invention is particularly advantageous due to superior physical properties including excellent resistance to water permeability and stain, exceptional toughness necessary for providing resistance to scratches and abrasion, and ability to provide rapid air purge during loading of the cassette with the x-ray film.

Other additional compounds may be added to the coating composition of the radiation curable composition, depending on the functions of the particular layer, including surfactants, emulsifiers, coating aids, rheology modifiers, crosslinking agents, antifoggants, inorganic fillers such as conductive and nonconductive metal oxide particles, biocide, and the like.

The radiation curable layer of the invention can be applied by any of a number of well known techniques, such as dip coating, rod coating, blade coating, air knife coating, gravure coating and reverse roll coating, slot coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published Dec. 1989, pages 1007 to 1008.

Such materials as those indicated immediately above have been described in the prior art and are commercially available from a number of manufacturers.

The radiographic phosphor panels of this invention comprise one or more continuous or discontinuous phosphor layers comprising prompt-emitting fluorescent phosphor particles dispersed in one or more film forming binders. The phosphors useful in this invention have a significant portion of their emitted wavelength between 350 and 750 nm of the electromagnetic spectrum. Preferably, the phosphor particles used have a primary emission of light at about 545 nm.

A wide variety of phosphors can be used in the practice of this invention. Phosphors are materials that emit infrared, visible, or ultraviolet radiation upon excitation. An intrinsic phosphor is a material that is naturally (that is, intrinsically) phosphorescent. An "activated" phosphor is one composed of a basic material that may or may not be an intrinsic phosphor, to which one or more dopant(s) has been intentionally added. These dopants "activate" the phosphor and cause it to emit infrared, visible, or ultraviolet radiation. For example, in $Gd_2O_2S$:Tb, the Th atoms (the dopant/activator) give rise to the optical emission of the phosphor.

Any conventional or useful phosphor can be used, singly or in mixtures, in the practice of this invention. More specific details of useful phosphors are provided as follows.

For example, useful phosphors are described in numerous references relating to prompt-emitting fluorescent intensifying screens, including but not limited to, *Research Disclosure*, Vol. 184, Aug. 1979, Item 18431, Section IX, X-ray Screens/Phosphors, and U.S. Pat. No. 2,303,942 (Wynd et al.), U.S. Pat. No. 3,778,615 (Luckey), U.S. Pat. No. 4,032,471 (Luckey), U.S. Pat. No. 4,225,653 (Brixner et al.), U.S. Pat. No. 3,418,246 (Royce), U.S. Pat. No. 3,428, 247 (Yocon), U.S. Pat. No. 3,725,704 (Buchanan et al.), U.S. Pat. No. 2,725,704 (Swindells), U.S. Pat. No. 3,617,743 (Rabatin), U.S. Pat. No. 3,974,389 (Ferri et al.), U.S. Pat. No. 3,591,516 (Rabatin), U.S. Pat. No. 3,607,770 (Rabatin), U.S. Pat. No. 3,666,676 (Rabatin), U.S. Pat. No. 3,795,814 (Rabatin), U.S. Pat. No. 4,405,691 (Yale), U.S. Pat. No. 4,311,487 (Luckey et al.), U.S. Pat. No. 4,387,141 (Patten), U.S. Pat. No. 5,021,327 (Bunch et al.), U.S. Pat. No. 4,865,944 (Roberts et al.), U.S. Pat. No. 4,994,355 (Dickerson et al.), U.S. Pat. No. 4,997,750 (Dickerson et al.), U.S. Pat. No. 5,064,729 (Zegarski), U.S. Pat. No. 5,108,881 (Dickerson et al.), U.S. Pat. No. 5,250,366 (Nakajima et al.), U.S. Pat. No. 5,871,892 (Dickerson et al.), EP-A-0 491,116 (Benzo et al.), the disclosures of all of which are incorporated herein by reference with respect to the phosphors.

Useful classes of phosphors include, but are not limited to, calcium tungstate ($CaWO_4$), niobium and/or rare earth activated or unactivated yttrium, lutetium, or gadolinium tantalates, rare earth (such as terbium, lanthanum, gadolinium, cerium, and lutetium)-activated or unactivated middle chalcogen phosphors such as rare earth oxychalcogenides and oxyhalides, and terbium-activated or unactivated lanthanum and lutetium middle chalcogen phosphors.

Still other useful phosphors are those containing hafnium as described for example in U.S. Pat. No. 4,988,880 (Bryan et al.), U.S. Pat. No. 4,988,881 (Bryan et al.), U.S. Pat. No. 4,994,205 (Bryan et al.), U.S. Pat. No. 5,095,218 (Bryan et al.), U.S. Pat. No. 5,112,700 (Lambert et al.), U.S. Pat. No. 5,124,072 (Dole et al.), and U.S. Pat. No. 5,336,893 (Smith et al.), the disclosures of which are all incorporated herein by reference.

Preferred rare earth oxychalcogenide and oxyhalide phosphors are represented by the following formula (1):

$$M'_{(w-n)}M''_{n}O_{w}X' \quad (1)$$

wherein M' is at least one of the metals yttrium (Y), lanthanum (La), (Gd), or lutetium (Lu), M" is at least of the rare earth metals, preferably dysprosium (Dy), erbium (Er), europium (Eu), holmium (Ho), neodymium (Nd), praseodymium (Pr), samarium (Sm), tantalum (Ta), terbium (Tb), thulium (Tm), or ytterbium (Yb), X' is a middle chalcogen (S, Se, or Te) or halogen, n is 0.0002 to 0.2, and w is 1 when X' is halogen or 2 when X' is a middle chalcogen. These include rare earth-activated lanthanum oxybromides, and terbium-activated or thulium-activated gadolinium oxysulfides such as $Gd_2O_2S$:Tb.

Other suitable phosphors are described in U.S. Pat. No. 4,835,397 (Arakawa et al.) and U.S. Pat. No. 5,381,015 (Dooms), both incorporated herein by reference, and including for example divalent europium and other rare earth activated alkaline earth metal halide phosphors and rare earth element activated rare earth oxyhalide phosphors. Of these types of phosphors, the more preferred phosphors include alkaline earth metal fluorohalide storage phosphors [particularly those containing iodide such as alkaline earth metal fluorobromo-iodide storage phosphors as described in U.S. Pat. No. 5,464,568 (Bringley et al.), incorporated herein by reference].

Another class of phosphors includes rare earth hosts and are rare earth activated mixed alkaline earth metal sulfates such as europium-activated barium strontium sulfate.

Particularly useful phosphors are those containing doped or undoped tantalum such as $YTaO_4$, $YTaO_4$:Nb, $Y(Sr)TaO_4$, and $Y(Sr)TaO_4$:Nb. These phosphors are described in U.S. Pat. No. 4,226,653 (Brixner), U.S. Pat. No. 5,064,729 (Zegarski), U.S. Pat. No. 5,250,366 (Nakajima et al.), and U.S. Pat. No. 5,626,957 (Benso et al.), all incorporated herein by reference.

Other useful phosphors are alkaline earth metal phosphors that can be the products of firing starting materials comprising optional oxide and a combination of species characterized by the following formula (2):

$$MFX_{1-z}I_{z}uM^{a}X^{a}{:}yA{:}eQ{:}tD \quad (2)$$

wherein "M" is magnesium (Mg), calcium (Ca), strontium (Sr), or barium (Ba), "F" is fluoride, "X" is chloride (Cl) or bromide (Br), "I" is iodide, $M^a$ is sodium (Na), potassium (K), rubidium (Rb), or cesium (Cs), $X^a$ is fluoride (F), chloride (Cl), bromide (Br), or iodide (I), "A" is europium (Eu), cerium (Ce), samarium (Sm), or terbium (Tb), "Q" is BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$,:$Nb_2O_5$, $Ta_2O_5$, or $ThO_2$, "D" is vanadium (V), chromium (Cr), manganese (Mn), iron (Fe), cobalt (Co), or nickel (Ni). The numbers in the noted formula are the following: "z" is 0 to 1, "u" is from 0 to 1, "y" is from $1\times10^{-4}$ to 0.1, "e" is form 0 to 1, and "t" is from 0 to 0.01. These definitions apply wherever they are found in this application unless specifically stated to the contrary. It is also contemplated that "M", "X", "A", and "D" represent multiple elements in the groups identified above.

Examples of useful phosphors include: SrS:Ce,SM, SrS:Eu,Sm, $ThO_2$:Er, $La_2O_2S$:Eu,Sm, ZnS:Cu,Pb, and others described in U.S. Pat. No. 5,227,253 (Takasu et al.), incorporated herein by reference. Phosphors can be used in any conventional particle size range and distribution. It is generally appreciated that sharper images are realized with smaller mean particle sizes, but light emission efficiency declines with decreasing particle size. Thus, the optimum mean particle size for a given application is a reflection of the balance between imaging speed and image sharpness desired. Conventional phosphor particle size ranges and distributions are illustrated in the phosphor teachings cited above.

One preferred method of formation of the radiographic phosphor panel embodies a method of producing the phosphor panel comprising a supported layer of phosphor particles dispersed in one or more binders and the protective coating of the invention thereover wherein the one or more binders consist essentially of one or more elastomeric and/or rubbery polymers and wherein the panel is prepared by the steps of dispersing phosphor particles in a binding medium consisting essentially of the elastomeric polymers, coating the dispersed phosphor particles so as to form a phosphor layer on the polymeric multi-layer reflector without compressing the resulting dried phosphor layer, and coating the protective coating of the invention thereover.

Such rubbery and/or elastomeric polymers can be thermoplastic elastomers or thermoplastic polyurethanes. These materials are preferred because they a tough polymers and provide good abrasion resistance to the phosphor panel. Other details of preparing phosphor layers and overcoats are well known in the art cited above.

The fluorescent layer contains sufficient binder to give structural coherence to the layer. The binders can be any of those conventionally used in phosphor panels. Such binders are generally chosen from organic polymers that are transparent to X-radiation and emitted radiation, such as the sodium o-sulfobenzaldehyde acetal of poly(vinyl alcohol), chlorosulfonated poly(ethylene), a mixture of macromolecular bisphenol poly(carbonates) and copolymers comprising bisphenol carbonates and poly(alkylene oxides), aqueous ethanol soluble nylons, poly(alkyl acrylates and methacrylates) and copolymers of alkyl acrylates and methacrylates with acrylic and methacrylic acid, and poly(vinyl butyral), and poly(urethane) elastomers. These and other useful binders are disclosed for example, in *Research Disclosure*, Vol. 154, Feb. 1977, Item 15444, and Vol. 182, Jun. 1979. Particularly preferred binders are poly (urethanes), such as those commercially available under the trademark ESTANE from Goodrich Chemical Co., the trademark PERMUTHANE from the Permuthane Division of ICI, Ltd., and the trademark CARGILL from Cargill, Inc. The fluorescent layer of the X-ray intensifying screen typically has a porosity of greater than 15%, and more typically between 15 and 30%.

As noted above, it is specifically contemplated to employ the radiographic phosphor panels of this invention in combination with one or more photosensitive recording materials such as silver halide radiographic films. The photosensitive recording materials and front and/or back radiographic phosphor panels are usually mounted in direct contact in a suitable cassette to form an imaging assembly. X-radiation in an imagewise pattern is passed through and partially absorbed in a front panel, and a portion of the absorbed X-radiation is re-emitted as a visible light image that exposes the silver halide emulsion units of the recording material.

Useful photosensitive radiographic materials are well known in the art, and are described for example in numerous patents and publications. They generally comprise a support having a single silver halide emulsion unit on each side thereof. Such units include one or more silver halide emulsion layers and optionally one or more hydrophilic non-photosensitive layers (such as protective overcoats and interlayers). Further details of the support and silver halide emulsion units are provided below. These radiographic materials are processed after imaging using any conventional wet processing chemistries.

In their simplest construction, the radiographic recording materials include a single silver halide emulsion layer on each side of the support. Preferably, however, there is also an interlayer and a protective overcoat on each side the support. General features of radiographic films are described in U.S. Pat. No. 5,871,892 (Dickerson et al.).

Any conventional transparent radiographic or photographic film support can be employed in constructing the films. Radiographic film supports usually are constructed of polyesters to maximize dimensional integrity and are blue tinted to contribute the cold (blue-black) image tone sought in the fully processed films. Radiographic film supports, including the incorporated blue dyes that contribute to cold image tones, are described in *Research Disclosure*, Item 18431, cited above, Section XII. Film Supports. *Research Disclosure*, Vol. 365, Sep. 1994, Item 36544, Section XV. Supports, illustrates in paragraph (2) suitable subbing layers to facilitate adhesion of hydrophilic colloids to the support. Although the types of transparent films set out in Section XV, paragraphs (4), (7) and (9) are contemplated, due to their superior dimensional stability, the transparent films preferred are polyester films, illustrated in Section XV, paragraph (8). Poly(ethylene terephthalate) and poly (ethylene naphthalate) are specifically preferred polyester film supports.

The transparent support can be subbed using conventional subbing materials that would be readily apparent to one skilled in the art.

The emulsion layers in the radiographic recording materials contain the light-sensitive high silver bromide relied upon for image formation. To facilitate rapid access processing the grains preferably contain less than 2 mol % (mole percent) iodide, based on total silver. The silver halide grains are predominantly silver bromide in content. Thus, the grains can be composed of silver bromide, silver iodobromide, silver chlorobromide, silver iodochlorobromide, silver chloroiodobromide or silver iodochlorobromide as long as bromide is present in an amount of at least 95 mol % (preferably at least 98 mol %) based on total silver content.

In addition to the advantages obtained by composition selection described above it is specifically contemplated to employ silver halide grains that exhibit a coefficient of variation (COV) of grain ECD of less than 20% and, preferably, less than 10%. It is preferred to employ a grain population that is as highly monodisperse as can be conveniently realized.

In addition, preferably at least 50% (and preferably at least 70%) of the silver halide grain projected area is provided by tabular grains having an average aspect ratio greater than 8, and preferably greater than 12. Tabular grains are well known and described in numerous publications including, but not limited to, U.S. Pat. No. 4,414,310 (Dickerson), U.S. Pat. No. 4,425,425 (Abbott et al.), U.S. Pat. No. 4,425,426 (Abbott et al.), U.S. Pat. No. 5,021,327 (Bunch et al.), U.S. Pat. No. 5,147,771 (Tauer et al.), and U.S. Pat. No. 5,582,965 (Deaton et al.).

Both silver bromide and silver iodide have significant native sensitivity within the blue portion of the visible spectrum. Hence, when the emulsion grains contain high (>50 mol %, based on total silver) bromide concentrations, spectral sensitization of the grains is not essential, though still preferred. It is specifically contemplated that one or more spectral sensitizing dyes will be absorbed to the surfaces of the grains to impart or increase their light-sensitivity. Ideally the maximum absorption of the spectral sensitizing dye is matched (for example, within ±10 nm) to the principal emission band or bands of the radiographic phosphor panel.

The radiographic X-ray films generally include a surface overcoat on each side of the support that is typically provided for physical protection of the emulsion layers. In addition to vehicle features discussed above the overcoats can contain various addenda to modify the physical properties of the overcoats. Such addenda are illustrated by *Research Disclosure*, Item 36544, Section IX. Coating physical property modifying addenda, A. Coating aids, B. Plasticizers and lubricants, C. Antistats, and D. Matting agents. Interlayers that are typically thin hydrophilic colloid layers can be used to provide a separation between the emulsion layers and the surface overcoats. It is quite common to locate some emulsion compatible types of surface overcoat addenda, such as anti-matte particles, in the interlayers.

Some conventional radiographic materials that can be used in the practice of the present invention include, but are not limited to, various KODAK T-MAT Radiographic Films, various KODAK INSIGHT Radiographic Films, KODAK X-OMAT Duplicating Film, various KODAK EKTASCAN Radiographic Films, KODAK CFT, CFL, CFS and CFE Radiographic Films, KODAK EKTASPEED and EKTASPEED PLUS Dental Films, KODAK ULTRASPEED Dental Film, KODAK X-OMAT K Film, KODAK X-OMAT UV Film, KODAK Min-R 2000 Mammography Film, and KODAK Min-R L Mammography Film.

EXAMPLES

The UV radiation curable urethane acrylate oligomer CN 968 was obtained from Sartomer. The initiator, Irgacure184 was obtained from Ciba-Geigy. The cure lamp used was an H bulb from Fusion UV Systems, Inc. Micronized polytetrafluoroethylene particles (average particle size 6–8 micrometers) Michem® Wax 492 were obtained from Michelman Inc and Superslip 6530 micronized wax particles (average particle size 6–8 micrometers) was obtained from Micro Powders Inc. Polymethyl methacrylate, Elvacite 2051, approximate molecular weight 350K, was obtained from INEOS Acrylics. The polyamide particles, Orgasol 2001 UD NAT 2 (P2, average particle size 5 micrometers), were obtained from ATOFINA Chemicals, Inc. The UV curable lubricant Dow Corning 31 Additive was obtained from Dow Corning. Unless otherwise specified all coatings were coated on a phospor screen prepared by coating 33.9 mg/cm$^2$ of gadoliniumoxysulfide:terbium phosphor (Nichia Chemical Corp) which had been dispersed in a solution of a polyurethane binder (Permuthane U6366, Stahl Corp.) in methylene chloride/methanol (93/7 by weight) such that the ratio of phosphor to binder was 21/1 onto a blue tinted polyester support having a thickness of 0.007 inches, (0.17 millimeters). The coating was done with a commonly used extrusion-type hopper and the solvent removed by evaporation.

Pencil Hardness Measurements

The Pencil Hardness values of the coatings were measured as follows. All samples were conditioned at 73° F./50% RH for at least 18 hours prior to measurement. Following this conditioning period, the resistance to visible marking was determined using ASTM D 3363 ("Standard Test Method for Film Hardness by Pencil Test"). In this procedure, pencils of varying hardness were prepared by sanding the tips into cylindrical shapes. The lead were then brought in contact with the coating surface using a 500 gram load, held at a 45 degree angle relative to the plane of the coating, and moved at a uniform speed across the surface of the coatings. Visual inspection was then used to determine the hardest lead that did not generate any visible damage to the coating.

Example 1 (Control)

A solution of cellulose acetate (CA398-3, Eastman Chemical Corp) was prepared in acetone. The polymer was dissolved at a concentration of 8% by weight. To the polymer solution was added polymeric matte beads of 14 micrometer average particle size. The matte beads were added at a concentration of 5% by weight of the cellulose acetate. The solution was coated onto the phosphor layer described above using a drawknife with a spacing of 0.005 inches, (0.13 millimeters). The solvent was removed by evaporation to form the protective overcoat.

Invention Example 2, Comparative Examples 3–4 (Abrasion Resistant Overcoats)

Three overcoat compositions were made containing the following: UV curable oligomer CN 968 (5.9%), Elvacite 2051 (8.9%), Irgacure 184 (0.3%), methyl ethyl ketone (41.3%), acetone (40.1%), particles as shown in Table 1 (3.6%). These solutions were coated over the phosphor layer described above using a drawknife with a spacing of 0.005 inches, (0.13 millimeters). The solvent was removed by evaporation and the coating kept dark or under yellow light until ready for curing. The coatings were cured using a Fusion Inc. UV curing furnace and a type H bulb. The speed of travel through the oven was adjusted to give a UV cure of approximately 0.13–0.14 j/cm$^2$ to obtain cured coatings at a nominal coverage of 5.38 g/m$^2$. Table 1 shows the abrasion resistance of these coatings as evaluated by scratching with the fingernail. The samples were then examined for glossy streaks as well. Air purge tests were run by assembling the coated intensifying screens into X-ray cassettes of the sizes specified in the Table, inserting a radiographic film in the cassette and holding the assembly together for 2 minutes before imaging the film with X-ray. The lack of image artifacts is indicative of good air purge.

TABLE 1

| Example | Particles in Overcoat | Air Purge 18 × 24 | Air Purge 20 × 30 | Abrasion resistance | Appearance of glossy streaks |
|---|---|---|---|---|---|
| 1 (Check) | Polymeric Matte | Pass | Pass | Scratches with some difficulty | Yes |
| 2 (invention) | Miwax 492 | Pass | Pass | Does not scratch | No |
| 3 (comparision) | Superslip 6530 | Pass | Pass | Scratches easily | Yes |
| 4 (comparision) | Orgasol 2001 | Pass | Fail | Scratches easily | Yes |

As Table 1 shows the choice of particle is crucial in obtaining good abrasion resistance and lack of gloss streaks. The polymeric matte, the polyamide particles and the wax particles all showed gloss streaks and unacceptable abrasion resistance. Example 2, the invention, also enabled air purge with both cassettes and at the same time provided abrasion resistance. The invention also showed resistance to stain when the screen wet with the Kodak Min-R 2000 film cleaner was contacted with the X ray film overnight in a cassette. The overcoat formulation of the invention exhibited a pencil hardness of 4 H on polyester support having a thickness of 0.007 inches, (0.17 millimeters) when tested as described above.

The invention has been described in detail with particular reference to certain preferred embodiments thereof, but it will be understood that variations and modifications can be effected within the spirit and scope of the invention.

What is claimed is:

1. An element comprising a wear-resistant coating wherein said coating consists essentially of radiation-cured urethane acrylate polymers and micronized particles consisting of polytetrafluoroethylene particles and wherein said micronized particles are present in an amount between 10 and 40 percent by weight of said coating, wherein said coating further comprises polymethylmethacrylate having a weight average molecular weight of greater than 100,000, wherein said coating is deposed upon an X-ray intensifying screen, and whenin the X-ray intensifying screen further comprises a fluorescent layer having a porosity of between 15 and 3%.

2. The element of claim 1 wherein said coating has a hardness of greater than 2 H pencil hardness.

3. The element of claim 1 wherein said coating has a hardness of between 2 H and 8 H pencil hardness.

4. The element of claim 1 wherein said polytetrafluoroethylene particles have an average size of less than 20 micrometers.

5. The element of claim 1 wherein said polytetrafluoroethylene particles have a size wherein at least 90% of the particles have a size of between 2 and 8 micrometers.

6. The element of claim 1 wherein said polytetrafluoroethylene particles have a weight average molecular weight of between 30,000 and 100,000.

7. The element of claim 1 wherein said polymethylmethacryate has a weight average molecular weight of between 100,000 and 2,000,000.

8. The element of claim 1, wherein said element further comprises a flexible polymeric support.

9. The element of claim 1 wherein said X-ray intensifying screen has a composition comprising a rare earth oxychalcogenide or oxyhalide phosphors.

* * * * *